(12) United States Patent
D'Athis (10) Patent No.: US 7,568,065 B2
(45) Date of Patent: Jul. 28, 2009

(54) METHOD FOR CARRYING OUT WRITING UPDATING AND ALLOCATING MEMORY ON A MEMORY MEDIUM

(75) Inventor: Thierry D'Athis, Versailles (FR)

(73) Assignee: Thales (FR)

( * ) Notice: Subject to any disclaimer, the term of this patent is extended or adjusted under 35 U.S.C. 154(b) by 108 days.

(21) Appl. No.: 10/560,837

(22) PCT Filed: Jun. 15, 2004

(86) PCT No.: PCT/EP2004/051110

§ 371 (c)(1),
(2), (4) Date: Dec. 15, 2005

(87) PCT Pub. No.: WO2004/111953

PCT Pub. Date: Dec. 23, 2004

(65) Prior Publication Data

US 2007/0101090 A1    May 3, 2007

(30) Foreign Application Priority Data

Jun. 17, 2003 (FR) .................................. 03 07290

(51) Int. Cl.
*G06F 12/02* (2006.01)
(52) U.S. Cl. ..................... 711/103; 711/155; 711/173
(58) Field of Classification Search ................ None
See application file for complete search history.

(56) References Cited

U.S. PATENT DOCUMENTS

| 5,226,155 | A | * | 7/1993 | Iijima ......................... 707/205 |
| 5,991,774 | A | * | 11/1999 | Tate et al. .................... 707/203 |
| 6,189,081 | B1 | * | 2/2001 | Fujio .......................... 711/171 |
| 6,618,789 | B1 | * | 9/2003 | Okaue et al. ................. 711/103 |
| 2001/0011267 | A1 | | 8/2001 | Yokota et al. | |

FOREIGN PATENT DOCUMENTS

FR    2 635 886 A    3/1990
FR    2 806 813 A    9/2001

* cited by examiner

*Primary Examiner*—Than Nguyen
(74) *Attorney, Agent, or Firm*—Lowe Hauptman Ham & Berner, LLP (57) ABSTRACT

The carrying out of the invention requires the preallocation of a memory spaces (A0 ... A6) group (DHS) to a card. The number of allocated memory spaces is greater than the number of records (E1 ... E6) of a related file (FHS). The number of extra-allocated memory spaces makes it possible to carry out the inventive updating operations. During the updating, only new data (d7) are written on the card without losing old data (d1). For this purpose, new data (d7) are written in the memory spaces (A2) which are free of old data (d1) of the file. Said memory spaces are selected from the preallocated memory spaces. When new data is written, a new descriptor (IHS2) of the file is written, thereby making it possible to retrieve the new file records from among the allocated memory spaces.

16 Claims, 4 Drawing Sheets

| ITS | E1 | E2 | E3 |
|---|---|---|---|
| 0 | A0 | A1 | A2 |
| 1 | A0 | A1 | A3 |
| 2 | A0 | A1 | A4 |
| 3 | A0 | A2 | A1 |
| 4 | A0 | A2 | A3 |
| 5 | A0 | A2 | A4 |
| 6 | A0 | A3 | A1 |
| 7 | A0 | A3 | A2 |
| 8 | A0 | A3 | A4 |
| 9 | A0 | A4 | A1 |
| 10 | A0 | A4 | A2 |
| 11 | A0 | A4 | A3 |
| 12 | A1 | A0 | A2 |
| 13 | A1 | A0 | A3 |
| 14 | A1 | A0 | A4 |
| 15 | A1 | A2 | A0 |
| 16 | A1 | A2 | A3 |
| 17 | A1 | A2 | A4 |
| 18 | A1 | A3 | A0 |
| 19 | A1 | A3 | A2 |

FIG. 15a

| ITS | E1 | E2 | E3 |
|---|---|---|---|
| 20 | A1 | A3 | A4 |
| 21 | A1 | A4 | A0 |
| 22 | A1 | A4 | A2 |
| 23 | A1 | A4 | A3 |
| 24 | A2 | A0 | A1 |
| 25 | A2 | A0 | A3 |
| 26 | A2 | A0 | A4 |
| 27 | A2 | A1 | A0 |
| 28 | A2 | A1 | A3 |
| 29 | A2 | A1 | A4 |
| 30 | A2 | A3 | A0 |
| 31 | A2 | A3 | A1 |
| 32 | A2 | A3 | A4 |
| 33 | A2 | A4 | A0 |
| 34 | A2 | A4 | A1 |
| 35 | A2 | A4 | A3 |
| 36 | A3 | A0 | A1 |
| 37 | A3 | A0 | A2 |
| 38 | A3 | A0 | A4 |
| 39 | A3 | A1 | A0 |

FIG. 15b

| ITS | E1 | E2 | E3 |
|---|---|---|---|
| 40 | A3 | A1 | A2 |
| 41 | A3 | A1 | A4 |
| 42 | A3 | A2 | A0 |
| 43 | A3 | A2 | A1 |
| 44 | A3 | A2 | A4 |
| 45 | A3 | A4 | A0 |
| 46 | A3 | A4 | A1 |
| 47 | A3 | A4 | A2 |
| 48 | A4 | A0 | A1 |
| 49 | A4 | A0 | A2 |
| 50 | A4 | A0 | A3 |
| 51 | A4 | A1 | A0 |
| 52 | A4 | A1 | A2 |
| 53 | A4 | A1 | A3 |
| 54 | A4 | A2 | A0 |
| 55 | A4 | A2 | A1 |
| 56 | A4 | A2 | A3 |
| 57 | A4 | A3 | A0 |
| 58 | A4 | A3 | A1 |
| 59 | A4 | A3 | A2 |

FIG. 15c

METHOD FOR CARRYING OUT WRITING UPDATING AND ALLOCATING MEMORY ON A MEMORY MEDIUM

BACKGROUND OF THE INVENTION

The present invention relates to the techniques for reading and writing data in a memory medium. It applies in particular to the reading and writing of data in chip cards, these cards being used as travel passes in public transport systems. The reading and writing are typically performed by bus ticketing devices or at metro gates or turnstiles.

The flow of travelers passing through a gate or a turnstile can, in peak periods, be between around 30 people per minute (in Europe) and 60 people per minute (in Asia). Magnetic stripe tickets enable the data to be communicated (read) and updated (written) quickly. In practice, the path of the ticket is the same as that of the traveler.

However, these tickets cannot be used to store a lot of data. An Edmonson format magnetic stripe ticket, for example, contains only 62 useful bits. Furthermore, these tickets cannot be used for secured transactions. Chip cards can be used to store more data. These cards can, furthermore, be equipped with encryption and authentication devices to secure the transactions. These encryption and authentication devices ensure that card writes are limited to those devices that are entitled.

The chip cards can, depending on their type, be read with contact or without contact. The former are read by positioning the chip of the card in contact with a magnetic read head. To this end, these cards are often inserted in a read slot. This mechanical constraint prevents the card from being moved with the traveler to follow the same path. It is therefore not possible to use these cards in the transport domain. Contactless chip cards are therefore used.

The contactless chip cards used in the transport domain normally comply with the standard ISO1443 concerning data interchanges (modulation, carrier). The communication area between card and antenna extends to 10 cm. In order to obtain a fluid motion as the traveler is walking, the duration of a transaction (called the ticket transaction time) must not exceed 150 ms. Above 200 ms, the traveler is subject to a noticeable stoppage time.

If the traveler does not leave his card for long enough in the communication area, the current transaction is interrupted. If the transaction is interrupted in the middle of a write, the stored data is not complete. It is therefore desirable for the write to be performed such that a card is restored to its initial state even when a transaction is interrupted. In other words, the card should contain the initial data if a transaction is interrupted.

Chip cards may or may not be equipped with a microprocessor. Micro-wired chip cards have no microprocessor. The memory space of these cards is divided into blocks. The reader accesses these blocks, in read and write modes, according to its requirements. However, the data on such cards is unstructured: the concept of logical file does not exist. Conversely, those cards equipped with a microprocessor present the stored data in a structured way, in the form of files. Typical of these are the microprocessor cards conforming to the standard ISO 7816-4 or the standard EN 726-3. However, these cards are more expensive than the micro-wired cards.

SUMMARY OF THE INVENTION

One object of the invention is to provide a method of reading and a method of writing data of a file in a memory medium (such as a micro-wired contactless chip card), the method being fast, simple to implement and enabling the memory medium to be restored to its initial state when a transaction (write) is interrupted.

Implementing the invention requires previously allocating a group (DHS) of memory spaces (A0 ... A6) in the card. A number of memory spaces greater than the number of records (E1 ... E6) of the file (FHS) concerned is allocated. The excess number of memory spaces allocated is used for update operations according to the invention.

In an update operation, only the new data (d7) is written to the card, with no loss of the old data (d1). To this end, the new data (d7) is written in memory spaces (A2) not occupied by old data (d1) from the file. These memory spaces are chosen from the previously allocated memory spaces. Once the new data is written, a new file descriptor (IHS2) is written enabling the new file records to be retrieved from the allocated memory spaces.

The invention applies advantageously to the writing of cyclic files.

BRIEF DESCRIPTION OF THE DRAWINGS

Other characteristics and advantages of the invention will become apparent from the description that follows, given in light of the appended drawings.

MORE DETAILED DESCRIPTION

There now follows a description of an example of an embodiment of the invention in a micro-wired chip card. This card is a contactless card used as a travel pass (also known as "contactless ticketing card").

Figure 1:
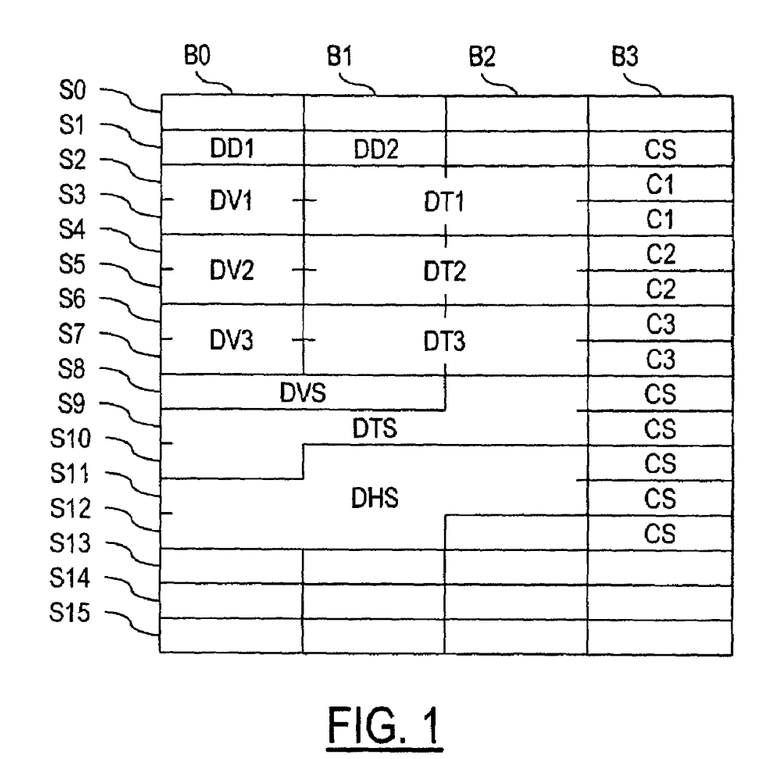
FIGS. 1 and 2 represent an example of data layout in the memory of a contactless card, FIG. 2 representing a detail of FIG. 1.

Reference is now made to FIG. 1, which represents an example of data layout in the memory of a micro-wired chip card. The data of a card is grouped in blocks, the blocks being grouped in sectors S0, S1, ..., S15. A block is the smallest addressable unit.

EXAMPLE 1

Memory of a Micro-wired Chip Card

This example describes the "MIFARE® STANDARD" memory card from PHILIPS. The card has 64 blocks. A block has 128 data bits, that is 16 bytes. The blocks are divided into groups of four, each group of blocks forming a sector. The blocks of a sector are referenced B0, B1, B2, B3 in FIG. 1. The card consequently has 16 sectors. The sectors are referenced S0 to S15.

End of example 1.

The data written to the card is protected. The only way of accessing the data is with an access key. An access key is a cryptographic secret required to be able to access the memory space protected by this secret.

Each access key has associated information concerning the rights of access to the data protected by the key. Thus, each access key limits more or less the rights of access to the data.

The various access rights can be:

N: no access in read or write mode;

R: access allowed in read mode only;

D: access allowed in read mode and write mode access limited to operations reducing the value of the stored data;

W: access allowed in read and write modes.

Data protected by one and the same key can have different access rights. Thus, a person can use a key to access certain data with extended rights (W for example) and other data with limited rights (R for example).

The same data can be protected by different access keys, enabling different access rights to be defined for this same data. Thus, a number of people holding different access keys can access the same data with more or less extensive access rights.

The access keys can be written in the card. These keys cannot be read. They can be modified, subject to knowing the keys already written.

EXAMPLE 2

Data Protection in the Card of Example 1

The fourth block B3 of each sector contains an access key A, an optional access key B, and the access rights to the four blocks B0 to B3 of this sector. Each access key is a number on 48 bits, that is, 6 bytes. The access rights can be encoded with the bits of the block B3 not used to encode the keys.

The access rights to the data of a data block (blocks B0 to B2) can be encoded with three bits. The table below, with five columns, gives an example of access rights encoding. The first three columns contain the coding bits for the access rights to a block. The fourth column contains the access rights associated with the key A. The fifth column contains the access rights associated with the key B.

| bit no-1 | bit no-2 | bit no-3 | key A | key B |
|---|---|---|---|---|
| 0 | 0 | 0 | W | W |
| 0 | 0 | 1 | D | D |
| 0 | 1 | 0 | R | R |
| 0 | 1 | 1 | N | W |
| 1 | 0 | 0 | R | W |
| 1 | 0 | 1 | N | R |
| 1 | 1 | 0 | D | W |
| 1 | 1 | 1 | N | N |

The access rights to the data of block B3 are special. In practice, modifying the data of this block is used to modify the value of a key and/or the coding data for the sector access rights. The access rights to the data of the block B3 can be:

R1: access allowed in read mode only to the coding data for the access rights;

R2: access allowed in read mode only to the coding data for the access rights and to the key B;

W1: access allowed in read mode and write mode to the coding data for the access rights;

W2R1: access allowed in write mode but not in read mode to the keys A and B, access allowed in read mode only to the coding data for the access rights;

W2R2: access allowed in write mode but not in read mode to the key A, access allowed in read mode and in write mode to the key B, access allowed in read mode only to the coding data for the access rights;

W2W1: access allowed in write mode but not in read mode to the keys A and B, access allowed in read mode and in write mode to the coding data for the access rights;

W3: access allowed in write mode but not in read mode to the key A, access allowed in read mode and in write mode to the key B and to the coding data for the access rights.

The access rights to the data of the block B3 can be encoded with three bits. The table below, with five columns, gives an example of the encoding of these access rights. The first three columns contain the coding bits for the access rights of this block. The fourth column contains the access rights associated with the key A. The fifth column contains the access rights associated with the key B.

| bit no. 1 | bit no. 2 | bit no. 3 | key A | key B |
|---|---|---|---|---|
| 0 | 0 | 0 | W2R2 | N |
| 0 | 0 | 1 | W3 | N |
| 0 | 1 | 0 | R2 | N |
| 0 | 1 | 1 | R1 | W2W1 |
| 1 | 0 | 0 | R1 | W2R1 |
| 1 | 0 | 1 | R1 | W1 |
| 1 | 1 | 0 | R1 | R1 |
| 1 | 1 | 1 | R1 | R1 |

End of example 2.

The travel passes are processed by different machines. A first group of machines is used to carry out the sale or top-up operations. The machines of this first group are called vending machines. They include pass customization machines, vending machines, booking office vending machines. In a sales operation, the vending machine writes the data concerning the contract (characteristics of the route, subscription period, etc.). In a top-up operation, the vending machine increases a credit, if the card can be used to store a credit (electronic purse card), the value of the card being increased by the top-up credit.

A second group of machines is used to check the card and/or reduce its value in exchange for a transport service. The machines of this first group are called validation machines. They include ticketing devices without obstacles, gates, hand-held checking devices, information machines, bus consoles. The validation machines do not alter the contract data, but they need to be able to access it in read mode. The validation machines can in addition modify the value of the card, this value being represented by data called validation data.

The vending machines and the validation machines therefore access the card data with different access rights. These two machine types use different keys.

The vending machines can use a first key KV. The validation machines can use a second key KT, the access rights associated with the key KT being limited compared to those associated with the key KV.

EXAMPLE 3

Application to Public Transport Systems

The key KV can be used to access the contract data and the validation data in read and in write modes (W). The second key KT can also be used to access the validation data in read and in write modes (W). However, it can be used to access the contract data only in read mode (R). The keys KV and KT respectively correspond to the keys B and A of the card (see example 2).

End of example 3.

As stated above, the data of different sectors can be protected by different sets of keys. By dividing the card into a number of sectors protected by separate access keys, the card can be used for different applications (multi-application cards).

This is useful also if a number of transport operators use one and the same card as a travel pass. Each transport operator can use a specific set of keys specific to them to access their data (in read and in write modes), exclusively. Other data can be shared by the different operators. The operators can use a set of keys that they share to access this data in a non-exclusive way.

EXAMPLE 4

Application to Public Transport Systems, with a Number of Operators (Alternative to Example 3)

The card contains private data of three transport operators, and data shared by these operators. Each operator accesses their private data exclusively. All the operators can access the shared data. As in the example 3, the data includes validation data and contract data.

The vending machines of an operator no. i (with i=1, 2 or 3) use a private key KVi to access the validation data (in read and in write modes) and contract data (in read and in write modes) of that operator. The vending machines of all the operators use a shared key KVS to access the data (validation, contract) shared between the operators. The machines access this shared data with the same access rights.

Similarly, the validation machines of an operator i use a private key KTi to access the validation data (in read and in write modes) and contract data (in read mode only) of that operator. The validation machines of all the operators use a shared key KTS to access the shared data with the same access rights.

A history log of the transactions is also written in the card. The validation machines and the vending machines of all the operators can access the history log data in read and in write modes, by respectively using the keys KTS and KVS.

End of example 4.

The vending machine and validation machine programs use files to access the data. A file is an ordered series of records. Each record includes data. A file has a determined number of records, each record having a determined size.

EXAMPLE 5

File-mode Organization of the Data for Example 4

The data is contained in nine files FVi, FTi (with i=1, 2 or 3), FVS, FTS, FHS. These files have a fixed number of records. Each record has 128 data bits, which corresponds to a block. Of course, the invention is not limited to this particular example: the size of a record can be different from the size of a block.

The table below has five columns. The first column contains the name of the file. The second column contains the number of records in the file. The third column contains a description of the file data. The fourth column summarizes the access rights to this data for the validation machines. These access rights are associated with the keys KTS, KT1, KT2 or KT3 which correspond to the key A of the card (see example 2). The fifth column reviews the access rights of the vending machines to this data. These access rights are associated with the keys KVS, KV1, KV2 or KV3 which correspond to the key B of the card (see example 2).

| File | Record | Data | key A | key B |
| --- | --- | --- | --- | --- |
| FTi | 1 | validation data of operator no. i | R | W |
| FTi | 1 | contract data of operator no. i | W | W |
| FVS | 1 | shared validation data | R | W |
| FTS | 3 | shared contract data | W | W |
| FHS | 6 | transaction history log | W | W |

End of example 5.

According to the invention, memory spaces of the card are allocated to write the records of the files. Each record is intended to be written in an allocated memory space. The allocation of memory spaces is based on determining parameters used by the programs of the machines implementing the write or read methods according to the invention. Thus, a memory space allocation is performed when programming the software used in these machines.

A memory space allocation is performed for a selected group of records. This group includes a determined number of records. Each record of the group has a determined size. The records of this group can, for example, be records of a file. However, the invention is not limited to this example. The group of records can be formed by just some of the records of a given file. Also, the records of the group can belong to a number of different files.

Some (even all) records of this group are intended to be updated. This update involves replacing the data of these records with new data.

According to the invention, a number N of memory spaces to be allocated is determined. This number exceeds the number of records in the group. The excess memory spaces are allocated for writing the new data on an update. The number of excess memory spaces is at least equal to the maximum number of records in the group of records likely to be updated simultaneously in a write operation.

A group of memory spaces is determined in the memory medium. This group has N memory spaces. Each memory space has a determined position and a determined size. The size of the memory spaces is sufficient to write into them the data from the records of the group.

Figure 3:
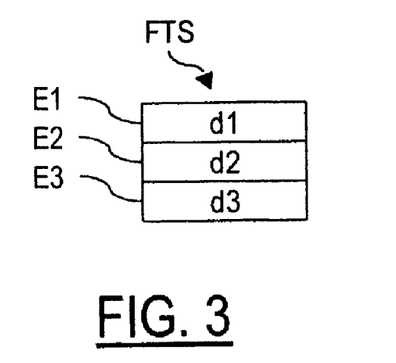
FIGS. 3, 5 and 7 represent a file, an example of layout of the file data in the memory, and a descriptor of this file.
Figure 5:
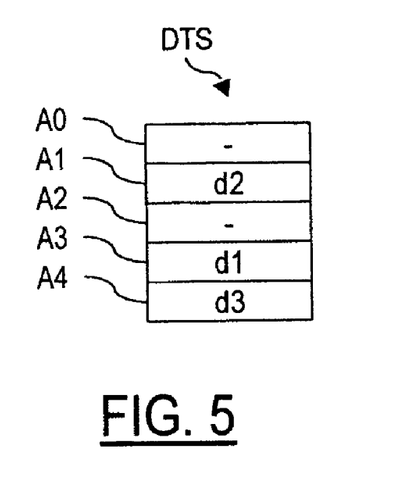

Reference is now made to FIGS. 3 and 5, which show the file FTS and an example of memory spaces allocated for this file. The file FTS has three records E1, E2, E3. A maximum of two of these records can be modified when updating the data of this file. A memory space is therefore allocated for each record, and two additional memory spaces for updating the data of this file. Consequently, a group DTS of five memory spaces A0, A1, A2, A3, A4 is allocated in total for the file FTS, two excess memory spaces being allocated compared to the records of the file.

The position of each memory space allocated is a parameter of the programs run by the machines implementing the write or read methods according to the invention. The position of each memory space is determined, such that each record of the file can be written in a memory space taken from the allocated memory spaces. The size of an allocated memory space (and the offset between two memory spaces) is at least equal to the size of the record that is written to it or is intended to be written to it.

Advantageously, in order to be compatible with the security mechanisms implemented by the card, the memory spaces allocated for a determined file are protected by the same access keys. Advantageously, the same access rights are associated with the access keys that protect memory spaces allocated for a determined file.

EXAMPLE 6

Allocation of the Card Memory Spaces of Examples 1 and 2 to write the data of example 4

Figure 2:
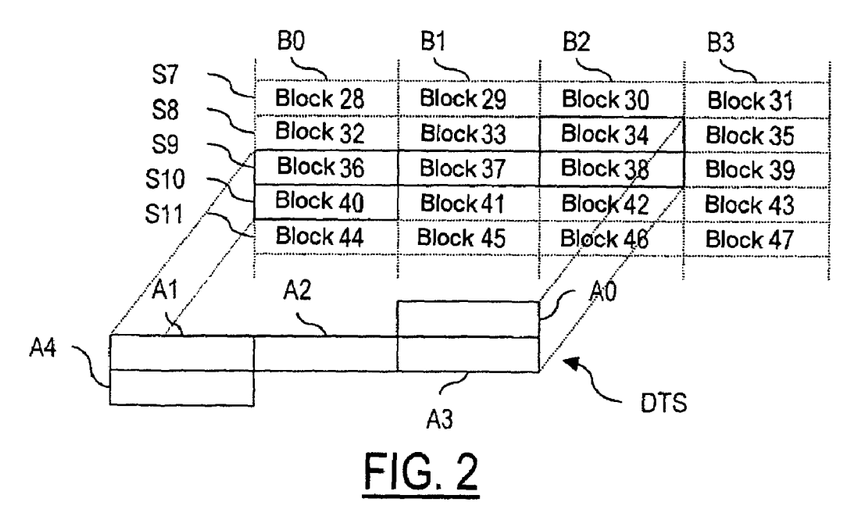

Reference is made to FIGS. 1 and 2. Groups of memory spaces DV1, DT1, DV2, DT2, DV3, DT3, DVS, DTS, DHS are allocated to write the records of the files FV1, FT1, FV2, FT2, FV3, FT3, FVS, FTS, FHS.

The table below has five columns. The first column contains the reference to a group of allocated memory spaces. The second column contains the number of blocks allocated (one block =one memory space in this example). The third column contains the name of the file whose records are intended to be written in these memory spaces. The fourth column reviews the number of records in the file. The fifth column contains the maximum number of records that can be modified in a file update.

| Spaces allocated | No. of blocks allocated | File | No. of records | Update |
| --- | --- | --- | --- | --- |
| DVi | 2 | FTi | 1 | 1 |
| DTi | 4 | FTi | 2 | 2 |
| DVS | 2 | FVS | 1 | 1 |
| DTS | 5 | FTS | 3 | 2 |
| DHS | 7 | FHS | 6 | 1 |

Of course, memory spaces can be allocated to write the records of a number of files, and not just a single file. In as much as one of the files is modified in each, update, this can reduce the excess number of memory spaces to be allocated.

End of example 6.

After having allocated memory spaces of the memory medium, the writing of the data according to the invention can be carried out. Each record of the file is written in a memory space taken from the allocated memory spaces. A file descriptor is then written into the memory medium. The file descriptor is a set of data used to determine the allocated memory space in which each record of the file is written.

Figure 7:
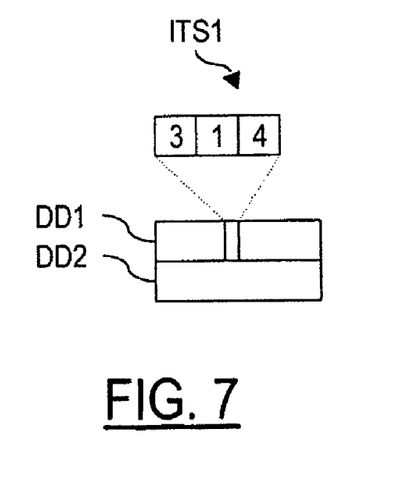

Reference is made to FIGS. 3, 5, and 7 to describe an example of writing file data. The file is the shared file FTS of the preceding examples. There are five allocated memory spaces A0, A1, ... A4 for writing the data of this file. The file FTS includes three records E1, E2, E3. The data d1, d2, d3 of these records is written in three memory spaces taken from the five allocated. For example, as illustrated in FIG. 5, the data d1 of the record E1 is written in the allocated memory space A3, the data d2 of the record E2 is written in the allocated memory space A1, and the data d3 of the record E3 is written in the allocated memory space A4. The descriptor ITS1 of the file FTS is then written. The descriptor ITS1 refers to the memory spaces A3, A1, A4, taken in this order. It enables the records of the file FTS to be retrieved.

According to the invention, once the records of a file have been written, they can be updated such that the file data stored remains unchanged if a write operation is interrupted before the end of the update.

Figure 4:
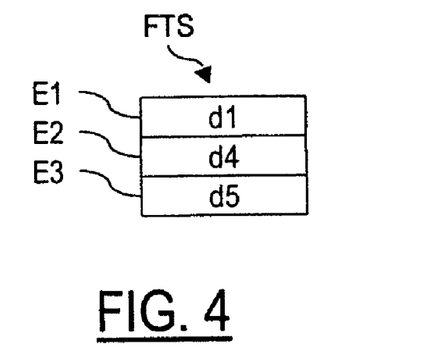
FIGS. 4, 6 and 8 represent the same elements as FIGS. 3, 5 and 7 after a file update operation.
Figure 6:
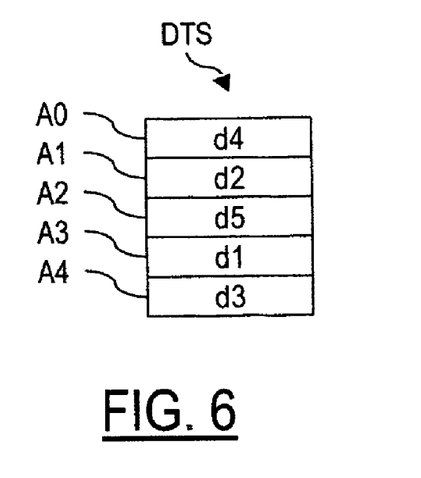

Reference is made to FIGS. 4, 6 and 7 to describe an example of updating the file FTS. This update takes place after the writing step described in relation to FIGS. 3, 5 and 7.

In this update step, the data d2 and d3, respectively contained in the records E2 and E3, is to be replaced by new data, d4 and d5.

The file descriptor ITS1 is first of all read (see FIG. 7). This is used to deduce the memory spaces which, out of the allocated memory spaces DTS, are not referenced by the descriptor ITS1. In this example, these are the memory spaces A0 and A2. The new data d4, d5 is written in memory spaces taken from the non-referenced memory spaces. In this example, the data d4 is written in the memory space A0 and the data d5 is written in the memory space A2. A new descriptor ITS2 of the file is written in the memory medium. The new descriptor ITS2 refers to the memory spaces A0 and A2 in place of the memory spaces A1 and A4 respectively. In other words, ITS2 references the memory spaces in which the new data d4, d5 is written instead of the memory spaces in which the old data d2, d3 is written.

Figure 8:
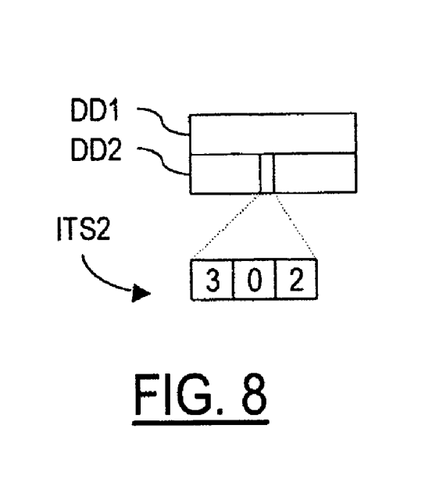

A file descriptor, such as ITS1 or ITS2, can, for example, contain a serial number for each allocated memory space. This serial number can, in this example, vary from zero to four. In the preceding examples, the descriptor ITS1 includes the numbers three, one and four. For its part, the descriptor ITS2 includes the numbers three, zero and two. Each of the numbers of a descriptor can be binary-encoded on three bits. The three numbers forming the descriptor ITS1 or ITS2 can thus be binary-encoded on nine bits.

This embodiment, in which the free memory spaces are not referenced, can be used to minimize the size of the file descriptor. However, this involves reading all of the file descriptor to deduce from it the free memory spaces.

According to another embodiment (not represented), the descriptors ITS1 and/or ITS2 reference not only the memory spaces used, but also the free memory spaces. For example, the free memory spaces can be the last memory spaces referenced in the file descriptor. This embodiment can be used to find the free memory spaces more quickly. It can also be used to distribute the wear between the memory blocks, by taking care not to write new data always in the same memory spaces.

However, this embodiment is interesting inasmuch as it does not impose writing the file descriptor in an additional data block. In practice, if an additional block has to be read, more time is lost in reading the data (access time) than in determining the memory spaces that are free (not referenced). Consequently, the first embodiment described will be preferred in this case.

According to an advantageous embodiment, the records of a file, for which a group of memory spaces is allocated, all have the same size. This makes it possible to limit the size of the memory spaces to be allocated. Advantageously, the size of these records is equal to a whole number of memory blocks. Advantageously, the memory spaces have exactly the same size as the records. When all the records of the file have the same size, the file descriptor can be used to find the file data by swapping the data stored in the memory spaces allocated for this file.

In order to test whether the stored data is complete, a seal can be used. A seal is a value that varies according to the data to be tested. This seal is stored on the card. The stored data is read, and the value associated with this data is calculated. This calculated value is compared to the stored seal value. If these values match, the stored data is assumed to be complete. One conventional way of implementing a seal is to calculate a cyclic redundancy code (CRC).

However, the use of a CRC is not satisfactory for testing the integrity of the data stored on a worn card (chip card or magnetic stripe card). Over time, some bits may retain a constant value, corresponding to the lower energy state (zero or one depending on the technology employed). These defective bits can be equally for the bits of the seal as for the data bits. Consequently, there is a possibility of a situation in which writing errors in the seal and the data cancel each other out, such that the errored data is assumed to be complete.

According to an embodiment of the invention, a seal is determined by counting the number of zeroes stored. For example, if the data stored on eight bits contains the number 240 (or "11110000" in binary), the associated seal value is 4 (or "100" in binary). If the low energy level is zero, certain bits of the stored number are likely to remain at zero. The stored seal value will be strictly less than the number of zeroes stored. Even if bits of the seal are errored (at zero instead of one), the stored seal value will be strictly less than the number of zeroes stored in the data. Counting the number of zeroes gives the same result if the low energy level is one (the seal value remains strictly greater than the number of zeroes stored in the data). Consequently, the integrity test by the seal remains reliable, even if the seal contains errored bits. In other words, card wear cannot provoke errors that cancel each other out.

Of course, the seal can be the number of zero bits with an additive constant added. This value can be multiplied by any strictly positive constant. As a general rule, the value of the seal is an increasing function of the number of zeroes contained in the data to be tested.

The seal can be applied to the file data. According to an advantageous embodiment, the seal is applied to the data of the file descriptor, and not to the data of the file itself. The integrity of the descriptor can thus be tested. The write operation is considered to have been completed correctly if the descriptor is written correctly, inasmuch as the step for writing the descriptor follows the step for writing the file data.

When the file data is read, the integrity of the data read is checked with the seal. It is thus possible to test whether the last transaction (write operation) has been completed successfully. In case of an error (transaction interrupted unexpectedly, for example), the invention can be used to retrieve the old file data. Thus, the old data stored on the card can be preserved, even when a transaction is interrupted unexpectedly.

The descriptor of the file corresponding to the old data (file before the update) can be retained in memory. For one and the same file, two descriptors (old and new) are therefore used. On each file update operation, the new descriptor can be written in place of the older one.

In order to distinguish the old descriptor from the new descriptor, a sequence number can be stored to date-stamp the descriptors. To distinguish the old descriptor from the new one, all that is needed is to encode the sequence number on two bits (number between zero and three).

The table below gives the most recent descriptor based on the sequence numbers associated with two descriptors A and B:

| Sequence number associated with A | Sequence number associated with B | Most recent descriptor |
| --- | --- | --- |
| 0 | 1 | B |
| 0 | 3 | A |
| 1 | 0 | A |
| 1 | 2 | B |
| 2 | 1 | A |
| 2 | 3 | B |
| 3 | 0 | B |
| 3 | 2 | A |

The combinations not shown (two sequence numbers of the same parity) correspond to abnormal states.

According to a variant of the embodiment, a sequence number can be used to test the age of the card. When this number reaches a determined value, corresponding to a predetermined average wear state, preventive maintenance can be applied, consisting in replacing the old card with a new card. In other words, the sequence number can be used to detect the moment when a card needs to be replaced.

When the cards are used as travel passes, a so-called ratification operation can be carried out. This operation consists in writing data to the card, this data certifying than the transaction (update) applied by a machine has been completed successfully. The card is said to be ratified when a ratification has been carried out. A card can be ratified only if, following a transaction, the machine has been able to check that the latter has been completed successfully.

According to an embodiment of the invention, a ratification is carried out by copying the new descriptor to the old descriptor. A ratified card has two identical descriptors. If the descriptors are different, the card has not been ratified.

It is no longer necessary to write a sequence number to distinguish the new descriptor from the old descriptor. To this end, a first memory location can be dedicated to writing new descriptors, the other location containing the copy made in ratification operations. On updates, the new descriptor is always written to the first memory location. At the end of the ratification, it is copied to the other location. This other location therefore always contains the old descriptor if the ratification has not taken place.

Reference is now made to FIGS. 9 to 14, which represent an example of updating a cyclic file.

Figure 9:
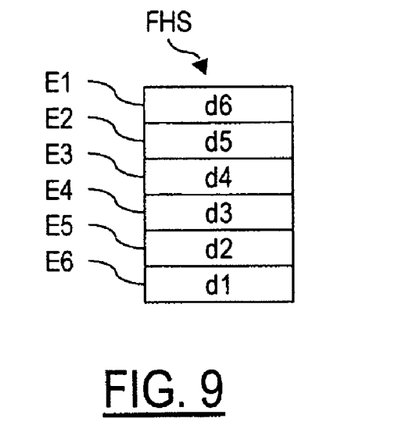
FIGS. 9 to 14 represent an example of a cyclic file update.

FIG. 9 represents the file FHS (transaction history log). This file has six records referenced E1 to E6. These records are written into memory in the group of seven memory spaces DHS. The group of memory spaces DHS, allocated for the file FHS, initially contains data referenced d6 to d1. A first file descriptor IHS1 includes, for example, a serial number for each memory space corresponding to each record. The descriptor IHS1 represented includes the sequence 3; 1; 5; 6; 0; 4, which means that the data of the records E1 to E6 is respectively stored in the memory spaces A3, A1, A5, A5, A0 and A4.

Figure 10:
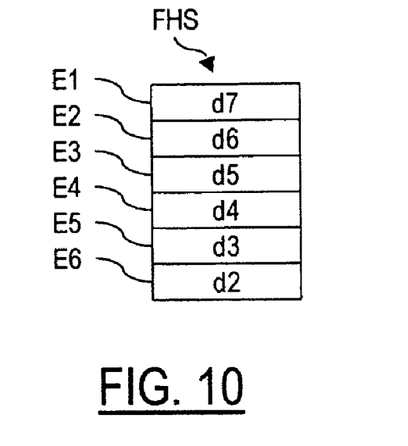
Figure 11:
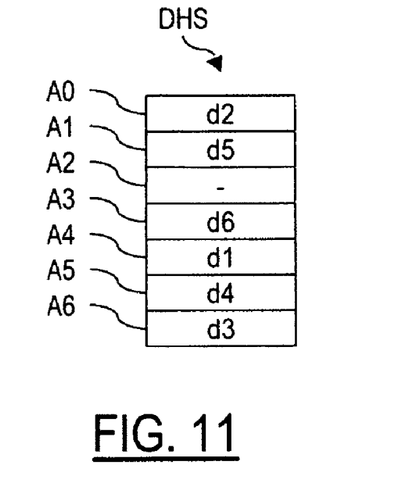
Figure 12:
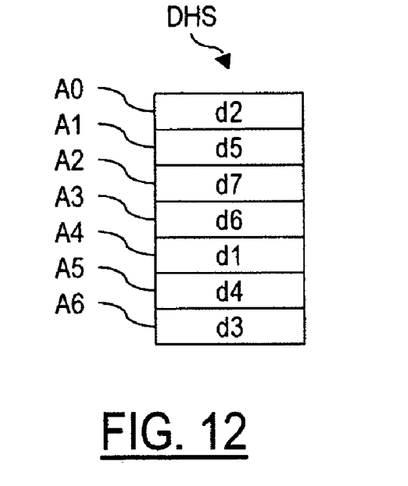

As illustrated in FIG. 10, in the file FHS update operation, data d7 is added to the record E1, the data d6 to d2 is shifted by one record, and the data d1 (formerly in the record E6) is deleted.

To this end, the new data d7 is written in the free memory space A2, that is, the memory space not referenced by IHS1 (see FIG. 12) in this exemplary embodiment. A new file descriptor IHS2 is written (see FIG. 13). It can be seen that the new file descriptor is deduced very simply from the old one. The new descriptor includes the sequence 2; 3; 1; 5; 6; 0. This sequence is deduced from the old descriptor by adding the number 2 at the start of the sequence, by shifting the other numbers, and by deleting the last number from the sequence.

Figure 13:
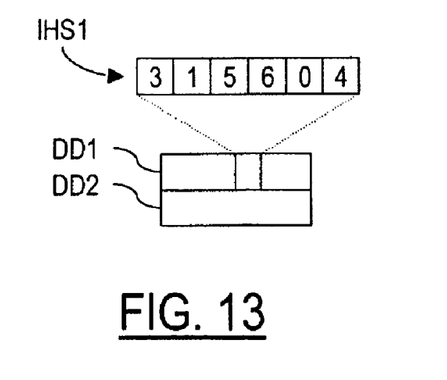
Figure 14:
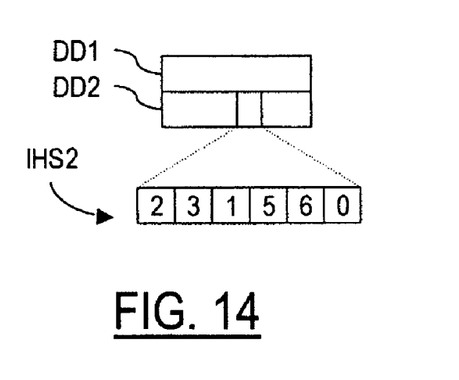

Thus, the invention can be used to update the data of the cyclic file very simply. All that is required is simply to write the new data d7 and write the new descriptor IHS2.

According to an advantageous embodiment, the file descriptors are encoded by a number representing an index in a predetermined table. This table contains all the possible arrangements of the records of the file in the allocated memory spaces.

Figure 15A:
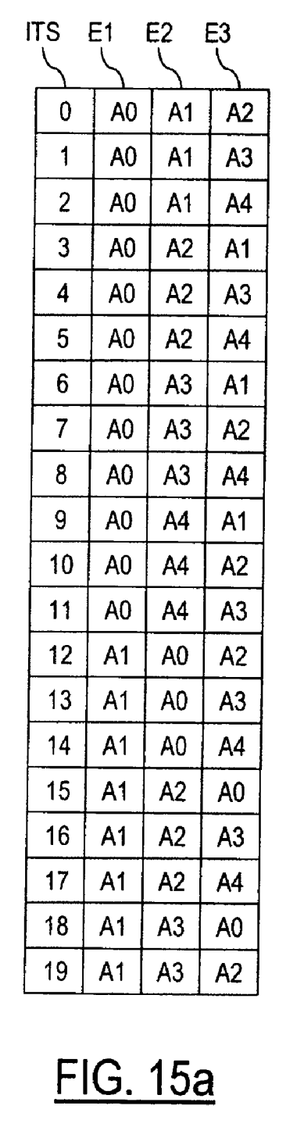
FIGS. 15a to 15c represent an example of swap table for applying an advantageous encoding of the file descriptors.
Figure 15B:
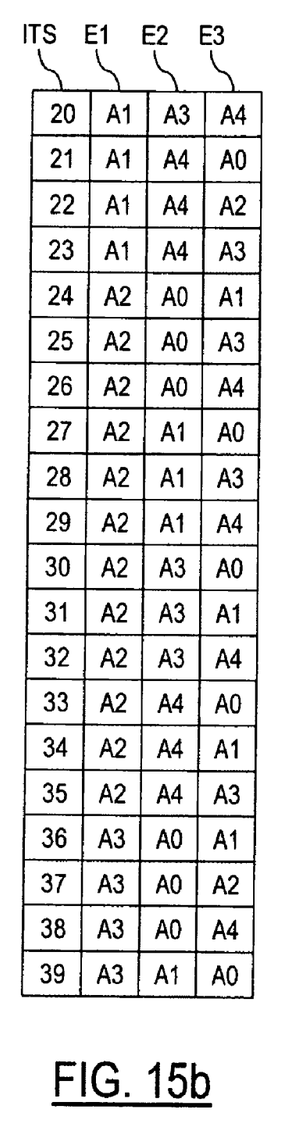
Figure 15C:
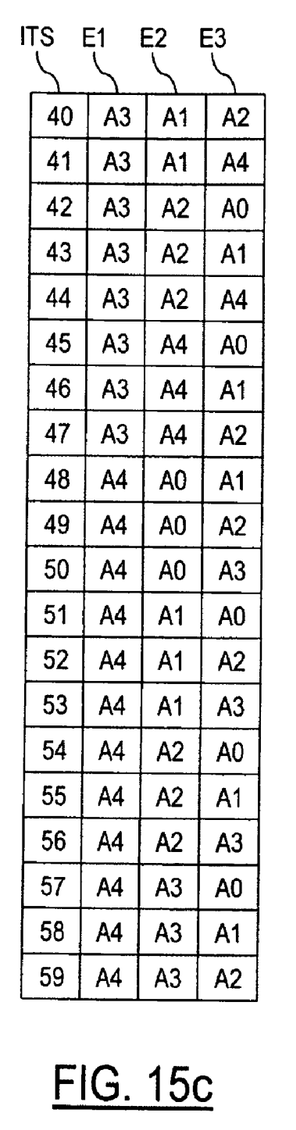

Reference is now made to FIGS. 15*a* to 15*c*. These figures represent examples of a table for encoding the descriptors ITS1 or ITS2.

The table includes a first column ITS, which is the index of the arrangement. The following three columns contain the reference of the memory space associated with each of the three records E1, E2, E3 of the file FTS. The number of possible arrangements of three records in five memory spaces is sixty (5!/2!=60). The unique number forming the descriptor ITS1 or ITS2 can therefore be binary-encoded with six bits instead of nine previously. The descriptor ITS1, which contained the sequence 3; 1; 4 can be replaced by the index 41. The descriptor ITS2, which contained the sequence 3; 0; 2, can be replaced by the index 37.

As a general rule, the number of possible arrangements is equal to N!/P!, in which N is the total number of memory spaces allocated and P is the excess number of memory spaces allocated compared to the number of records selected.

The invention claimed is:

1. A method of writing a file in a memory medium, the file including a determined number of data records, each record having a determined size, the method comprising the following steps:
   allocating a determined number of memory spaces of the memory medium to write the data of the file records, a position of each memory space being determined, the number of memory spaces allocated exceeding the total number of records in the file, the number of excess memory spaces P being at least equal to a maximum number of records of a group of records likely to be updated simultaneously in a write operation;
   writing the data of each file record in a memory space taken from the allocated memory spaces;
   writing a descriptor of the file in the memory medium, the file descriptor referencing memory spaces taken from the allocated memory spaces to enable the allocated memory space in which the data of each file record is written to be determined.

2. The method of writing according to claim 1, wherein the records of a file, for which a group of memory spaces is allocated, all have the same size.

3. The method of writing according to claim 1, wherein the descriptor is encoded by a number representing an arrangement index in a predetermined table, said table containing all the possible arrangements of the records of the file in the allocated memory spaces.

4. The method of writing according to claim 1, wherein a seal is stored, associated with the data of each descriptor, the seal being an increasing function of the number of zero bits in the descriptor.

5. The method of writing according to claim 1, wherein a sequence number is stored, associated with each descriptor.

6. The method of writing according to claim 5, wherein the sequence number is encoded on two bits.

7. The method of writing according to claim 1, wherein the free memory spaces are not referenced to minimize the size of the file descriptor.

8. A method of updating a file written in a memory medium, the file comprising a determined number of records of determined sizes, some of these records being intended to be updated with new data replacing old data, wherein:
   a determined number of memory spaces of the memory medium being allocated to write the data from the file records, the number of allocated memory spaces exceeding the total number of file records, the number of excess memory space P being at least equal to a maximum number of records of a group of records likely to be updated simultaneously in a write operation;
   a position of each memory space being determined;
   the data of each file record being written in a memory space taken from the allocated memory spaces;
   a first file descriptor of the file being written in the memory medium, the first file descriptor referencing memory spaces being taken from the allocated memory spaces to enable the allocated memory space in which the data of each file record is written to be determined,
   the first file descriptor being read;
   free allocated memory spaces being deduced from the first file descriptor;
   new data being written in memory spaces taken from the free allocated memory spaces;
   a new descriptor of the file being written in the memory medium, the new descriptor referencing the memory spaces in which the new data is written in place of the memory spaces in which the old data is written.

9. The method of updating according to claim 8, wherein the records of a file, for which a group of memory spaces is allocated, all have the same size.

10. The method of updating according to claim 8, wherein the descriptor is encoded by a number representing an arrangement index in a predetermined table, said table containing all the possible arrangements of the records of the file in the allocated memory spaces.

11. The method of updating according to claim 8, wherein a seal is stored, associated with the data of each descriptor, the seal being an increasing function of the number of zero bits in the descriptor.

12. The method of updating according to claim 8 wherein a sequence number is stored, associated with each descriptor.

13. The method of updating according to claim 12, wherein the sequence number is encoded on two bits.

14. The method of updating according to claim 8, wherein the free memory spaces are not referenced to minimize the size of the file descriptor.

15. The method of updating according to claim 8, wherein the new descriptor is copied to the first descriptor to perform a ratification.

16. A method of allocating memory spaces of a memory medium comprising the steps of:
   selecting a group of records of data, these records belonging to one or more files (FTS), the data of these records being intended to be written in the memory medium, the group of records comprising a determined number of records, each record of the group having a determined size;
   determining a number N of memory spaces is the number N exceeding the number of records in the group of records, the number of excess memory spaces P being at least equal to the maximum number of records of the group of records likely to be updated simultaneously in a write operation;
   choosing a group of memory spaces, including N memory spaces, the memory spaces of the group forming the memory spaces being allocated to write the data of the selected records, each memory space in the group having a determined size and a determined position, the size of the memory spaces being sufficient to write into them the data from the records of the group.

* * * * *